(12) United States Patent
Kim (10) Patent No.: US 6,249,549 B1
(45) Date of Patent: Jun. 19, 2001

(54) DOWN CONVERSION SYSTEM USING A PRE-DECIMATION FILTER

(75) Inventor: Hee-Yong Kim, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/169,790

(22) Filed: Oct. 9, 1998

(51) Int. Cl.[7] .................................................. H04B 1/66
(52) U.S. Cl. ........................................ 375/240.21; 382/248
(58) Field of Search ........................... 375/240.16, 240.2, 375/240.25, 240, 240.12, 240.13, 240.21; 348/426.1, 441, 443, 445, 449, 458, 459, 556, 565, 384.1, 408.1, 427.1; 382/269, 264, 248, 232, 239

(56) References Cited

U.S. PATENT DOCUMENTS

| | | | | |
|---|---|---|---|---|
| 5,635,985 | * | 6/1997 | Boyce et al. ........................... | 348/556 |
| 5,708,732 | * | 1/1998 | Merhav et al. ....................... | 382/232 |
| 5,926,573 | * | 7/1999 | Kim et al. .............................. | 382/239 |
| 6,061,400 | * | 5/2000 | Pearlstein et al. ............... | 375/240.12 |
| 6,061,402 | * | 5/2000 | Boyce et al. .......................... | 375/240 |
| 6,100,932 | * | 8/2000 | Boyce et al. ..................... | 375/240.16 |
| 6,104,434 | * | 8/2000 | Nakagawa et al. .............. | 375/240.16 |

* cited by examiner

Primary Examiner—Chris Kelley
Assistant Examiner—Gims Philippe
(74) Attorney, Agent, or Firm—Ratner & Prestia (57) ABSTRACT

An HDTV down conversion system including an apparatus for forming a low resolution video signal from an encoded video signal representing a video image. The encoded video signal is a frequency-domain transformed high resolution video signal with motion vectors. The apparatus includes a receiver for receiving the encoded video signal as a plurality of blocks of high resolution frequency-domain video coefficient values. A plurality of blocks comprises a macroblock. A down-conversion filter weights selected ones of the high resolution frequency-domain video coefficient values within each block to generate corresponding blocks of filtered frequency-domain video coefficients. An inverse-transform processor transforms each block of filtered frequency-domain video coefficients into a block of first-filtered pixel values. A pre-decimation filter performs inter-macroblock inter-block filtering of the plurality of blocks of first-filtered pixel values and provides corresponding blocks of second-filtered pixel values. A decimating processor deletes selected ones of the second-filtered pixel values within each block to provide blocks of low resolution video signal pixel values.

28 Claims, 8 Drawing Sheets

DOWN CONVERSION SYSTEM USING A PRE-DECIMATION FILTER

FIELD OF THE INVENTION

The present invention relates to a decoder which converts and formats an encoded high resolution video signal, e.g. MPEG-2 encoded video signals, to a decoded lower resolution output video signal, and more specifically to a down conversion system for the decoder.

BACKGROUND OF THE INVENTION

In the United States a standard has been proposed for digitally encoded high definition television signals (HDTV). A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, November 1994 which is available from the ISO and which is hereby incorporated by reference for its teaching on the MPEG-2 digital video coding standard.

The MPEG-2 standard is actually several different standards. In MPEG-2, several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level, is intended for coding high-definition television images.

Images encoded according to the Main Profile, High Level standard may have as many as 1,152 active lines per image frame and 1,920 pixels per line.

The Main Profile, Main Level standard, on the other hand, defines a maximum picture size of 720 pixels per line and 576 lines per frame. At a frame rate of 30 frames per second, signals encoded according to this standard have a data rate of 720*576*30 or 12,441,600 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile, Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field, and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer and the macroblock layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

A down conversion system converts a high definition input picture into lower resolution picture for display on a lower resolution monitor. Down conversion of high resolution Main Profile, High Level pictures to Main Profile, Main Level pictures, or other lower resolution picture formats, has gained increased importance for reducing implementation costs of HDTV. Down conversion allows replacement of expensive high definition monitors used with Main Profile, High Level encoded pictures with inexpensive existing monitors which have a lower picture resolution to support, for example, Main Profile, Main Level encoded pictures, such as NTSC or 525 progressive monitors.

To effectively receive the digital images, a decoder should process the video signal information rapidly. To be optimally effective, the coding systems should be relatively inexpensive and yet have sufficient power to decode these digital signals in real time.

One method of down conversion of the prior art simply low pass filters and decimates the decoded high resolution, Main Profile, High Level picture to form an image suitable for display on a conventional television receiver. Consequently, using existing techniques, a decoder employing down conversion may be implemented using a single processor having a complex design, considerable memory, and operating on the spatial domain image at a high data rate to perform this function. The high resolution, and high data rate, however, requires very expensive circuitry, which would be contrary to the implementation of a decoder in a consumer television receiver in which cost is a major factor.

SUMMARY OF THE INVENTION

The present invention is embodied in an apparatus for forming a low resolution video signal from an encoded video signal representing a video image. The encoded video signal is a frequency-domain transformed high resolution video signal. The apparatus includes a means for receiving the encoded video signal as a plurality of blocks of high resolution frequency-domain video coefficient values. A down-conversion filter weights selected ones of the high resolution frequency-domain video coefficient values within each block to generate corresponding blocks of filtered frequency-domain video coefficients. An inverse-transform processor transforms each block of filtered frequency-domain video coefficients into a block of first-filtered pixel values. A pre-decimation filter performs inter-block filtering of the plurality of blocks of first-filtered pixel values and provides corresponding blocks of second-filtered pixel values. A decimating means deletes selected ones of the second-filtered pixel values within each block to provide blocks of low resolution down sampled video signal pixel values.

According to one aspect of the invention, the decimating means is coupled to an up-sampling filter which converts the blocks of low resolution down sampled video signal pixel values into up-sampled blocks of low resolution video signal pixel values. An adder then adds the upsampled blocks of low resolution video signal pixel values to the block of first-filtered pixel values to provide a sum which is filtered by the pre-decimation filter and then decimated by the decimating means. The combined frequency response characteristic of the up-sampling filter and the pre-decimation filter conforms to a response characteristic of a Lagrange interpolator.

BRIEF DESCRIPTION OF THE DRAWINGS

These and other features and advantages of the present invention will become apparent from the following detailed description, taken in conjunction with the accompanying drawings, wherein.

DETAILED DESCRIPTION

I. Decoder Overview

The exemplary embodiment of the invention filters decoded HDTV signals which have been encoded according to the MPEG-2 standard and in particular, the Main Profile, High Level MPEG-2 standard.

The invention described herein, however, is not limited to down conversion filtering of decoded HDTV signals. The filtering method described below may also be used to filter other types of frequency-domain encoded digital signals which may be divided into sections, filtered, and then recombined.

The MPEG-2 Main Profile standard defines a sequence of images in five levels: the sequence level, the group of pictures level, the picture level, the slice level and the macroblock level. Each of these levels may be considered to be a record in a data stream, with the later-listed levels occurring as nested sub-levels in the earlier listed levels. The records for each level include a header section which contains data that is used in decoding its sub-records.

Macroblocks are composed of six blocks, 4 luminance blocks Y and 2 chrominance blocks, Cr and Cb. Each block of the encoded HDTV signal contains data representing 64 respective coefficient values of a two dimensional discrete cosine transform (DCT) representation of 64 picture elements (pixels) in the HDTV image.

In the encoding process, the pixel data is subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

Figure 1:
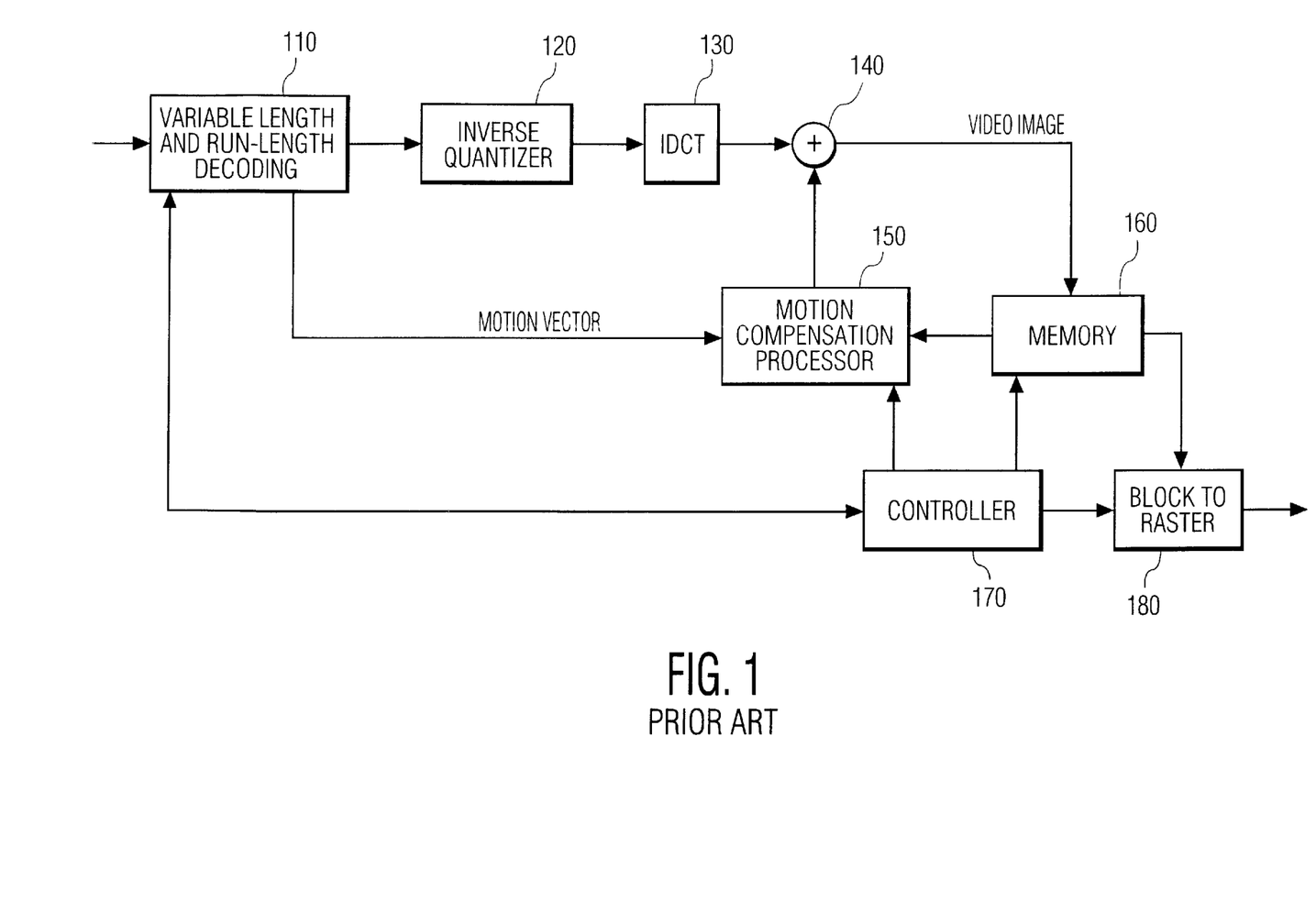
FIG. 1 is a high level block diagram of a video decoding system of the prior art.

FIG. 1 is a high level block diagram of a typical video decoding system of the prior art. The video decoder of the prior art includes an entropy decoder 110, which is usually a variable length decoder and a run length decoder, an inverse quantizer 120, and an inverse discrete cosine transform (IDCT) processor 130. The exemplary system also includes a controller 170 which controls the various components of the decoding system responsive to the control information retrieved from the input bit stream by the entropy decoder 110. For processing of prediction images, the prior art system further includes a memory 160, adder 140, a motion compensation processor 150, and a block to raster converter 180.

The variable length decoder 110 receives the encoded video image signal, and reverses the encoding process to produce control information including motion vectors describing the relative displacement of a matching macroblock in a previously decoded image. This matching macroblock corresponds to a macroblock of the predicted picture that is currently being decoded. The variable length decoder 110 also receives the quantized DCT transform coefficients of the blocks of either the current video image which is referred to as the residual video image, if intraframe encoding is used, or the difference between the current and the predicted video image, if interframe encoding is used. The inverse quantizer 120 receives the quantized DCT transform coefficients and reconstructs the quantized DCT coefficients for a particular macroblock. The quatization matrix to be used for a particular block is received from the variable length decoder 110.

The IDCT processor 130 transforms the reconstructed DCT coefficients to pixel values in the spatial domain (for each block of 8×8 matrix values representing luminance or chrominance components of the macroblock, and for each block of 8×8 matrix values representing the differential luminance or differential chrominance components of the predicted macroblock).

If the current macroblock is not predictively encoded, then the output matrix values are the pixel values of the corresponding macroblock of the current video image. If the macroblock is interframe encoded, the corresponding macroblock of the previous video picture frame (a reference frame) is stored in memory 160 for use by the motion compensation processor 150. The motion compensation processor 150 receives the previous macroblock from memory 160 responsive to the motion vector which is received from the entropy decoder 110. The motion compensation processor 150 then adds the previous macroblock to the current IDCT transformed macroblock (corresponding to a residual component of the present predictively encoded frame) in adder 140 to produce the corresponding macroblock of pixels for the current video image, which is then stored into the memory 160.

II. Down Conversion System

A. Overview

Figure 2:
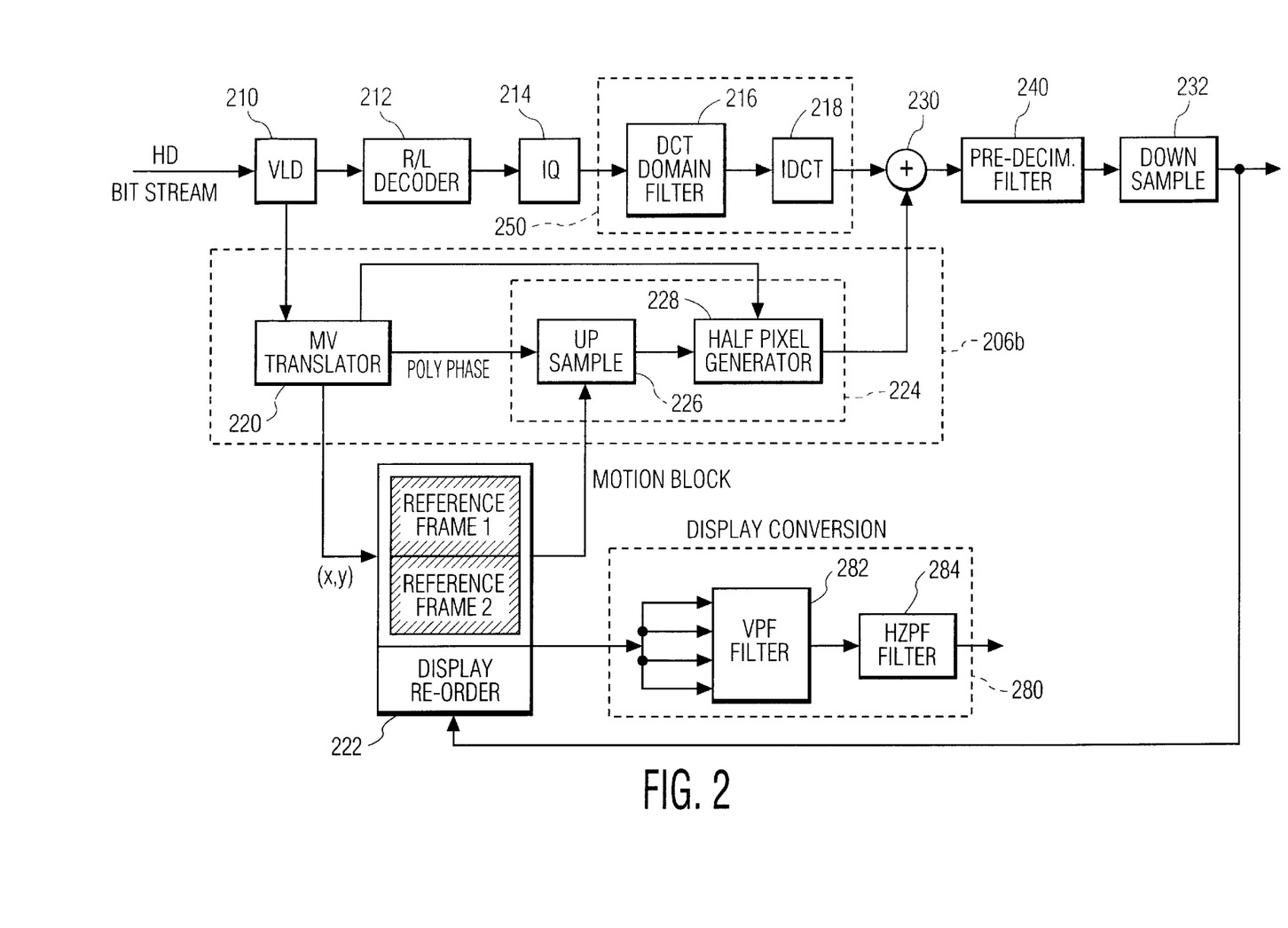
FIG. 2 is a high level block diagram of an exemplary embodiment of a down conversion system having a DCT domain filter and a pre-decimation filter.

FIG. 2 is a high level block diagram of an exemplary embodiment of a down conversion system. As shown in FIG. 2, the down conversion system includes a variable length decoder (VLD) 210, a run-length (R/L) decoder 212, an inverse quantizer 214, and an inverse discrete cosine transform (IDCT) processor 218. In addition, the down conversion system includes a down conversion filter (DCT filter) 216, a pre-decimation filter 240, and a down sampling processor 232 for filtering of encoded pictures. While the following describes the exemplary embodiment for a Main Profile, High Level encoded input, the down conversion system may be implemented with any similarly encoded high resolution image bit stream.

The down conversion system also includes a motion vector (MV) translator 220, a high resolution motion block generator 224 including up-sampling processor 226 and half-pixel generator 228 and a reference frame memory 222.

In addition, the system includes a display conversion block 280 including a vertical programmable filter (VPF) 282 and horizontal programmable filter (HZPF) 284. The display conversion block 280 converts downsampled images into images for display on a particular display having a lower resolution.

The down conversion filter 216 performs an intra-block lowpass filtering of the high resolution (e.g. Main Profile, High Level DCT) coefficients in the frequency domain. The pre-decimation filter 240 performs an inter-block low pass filtering of the spatial pixel values. The down sampling processor 232 eliminates selected spatial pixel values by decimation of the lowpass filtered Main Profile, High Level picture to produce a set of pixel values which can be displayed on a monitor having lower resolution than that required to display a Main Profile, High Level picture. The exemplary reference frame memory 222 stores the spatial pixel values corresponding to at least one previously decoded reference frame having a resolution corresponding to the down-sampled picture. For non-intra macroblock encoding, the MV translator 220 scales the motion vectors for each block of the received picture consistent with the reduction in resolution, and the low resolution motion block generator 224 receives the decimated low resolution motion blocks provided by the reference frame memory 222, up-samples these motion blocks and generates half pixel values to provide motion blocks at the half pixel accuracy which exhibit good spatial correspondence to the decoded and filtered differential pixel blocks.

The operation of this exemplary embodiment of a down conversion system for intra-macroblock encoding is now described. The Main Profile, High Level bit-stream is received and decoded by VLD 210. In addition to header information used by the HDTV system, the VLD 210 provides DCT coefficients for each block and macroblock, and motion vector information. The DCT coefficients are run length decoded in the R/L decoder 212 and inverse quantized by the inverse quantizer 214. The VLD 210 and R/L decoder 212 correspond to the entropy decoder 110 of FIG. 1.

Since the received video image represented by the DCT coefficients is a high resolution picture, the DCT coefficients of each block are lowpass filtered before decimation of the high resolution video image. The inverse quantizer 214 provides the DCT coefficients to the DCT filter 216 which performs a lowpass filtering in the frequency domain by weighting the DCT coefficients with predetermined filter coefficient values before providing them to the IDCT processor 218. In an exemplary embodiment, this filter operation is performed on a block by block basis.

The IDCT processor 218 provides spatial pixel values by performing an inverse discrete cosine transform of the filtered DCT coefficients. The pre-decimation filter 240 filters the spatial pixel values provided by the IDCT processor 218. The down sampling processor 232 reduces the picture sample size by eliminating spatial pixel values according to a predetermined decimation ratio; therefore, storing the lower resolution picture uses a smaller frame memory 222 compared to that which would be needed to store the higher resolution Main Profile, High Level picture.

The operation of this exemplary embodiment of a down conversion system for non-intra macroblock encoding is now described. In this exemplary embodiment, following the MPEG standard, the DCT coefficients of the current received image represent the DCT coefficients of the residual components of the predicted image macroblocks. The horizontal components of the motion vectors are scaled since the low resolution reference pictures of previous frames stored in the reference frame memory 222 do not have the same number of pixels as the high resolution predicted frame (Main Profile, High Level).

Referring to FIG. 2, the motion vectors of the Main Profile, High Level bit stream provided by the VLD 210 are provided to the MV translator 220. Each motion vector is scaled by the MV translator 220 to reference the appropriate prediction block of the reference frame of a previous image stored in reference frame memory 222. The size (number of pixel values) in the retrieved block is smaller than a block of the corresponding high resolution block used to encode the current image; consequently, the retrieved block is up-sampled to form a prediction block having the same number of pixels as the residual block provided by the IDCT processor 218.

The prediction block is up-sampled by the up-sampling processor 226 responsive to a control signal from the MV translator 220 to generate a block corresponding to the original high resolution block of pixels. Then, half pixel values are generated, if indicated by the motion vector for the up-sampled prediction block in the half-pixel generator 228, to ensure proper spatial alignment of the prediction block. The up-sampled and aligned prediction block is added in adder 230 to the current filtered block, which is, for this example, the reduced resolution residual component from the predicted block. All the processing is done on a macroblock by macroblock basis. After the motion compensation process is complete for the current macroblock in the upsampling domain, the reconstructed macroblock is filtered by the pre-decimation filter 240 and then decimated accordingly in the down sampling processor 232. The pre-decimation filter 240 operates with a fixed kernel size to filter spatial pixel values across block and macroblock boundaries. Thus, the pre-decimation filter 240 is an inter-block filter. The pre-decimation filter 240 acts to reduce blocking artifacts in the decoded image which may result, for example, from the intra-block frequency domain filter 216. The decimation process does not reduce the resolution of the image but simply removes redundant pixels from the low resolution filtered image.

Once the downsampled macroblocks for an image are available, the display conversion block 280 adjusts the image for display on a low resolution television display by filtering the vertical and horizontal components of the down-sampled image in the VPF 282 and the HZPF 284 respectively.

B. Macroblock Prediction

Since the reference frames of previous images are down sized, the received motion vectors pointing to these frames may also be translated according to the conversion ratio. The following describes the motion translation for the luminance block, for example, in the horizontal direction. One skilled in the art would easily extend the following discussion to motion translation in the vertical direction if used. Denoting x and y as the current macroblock address in the original image frame, Dx as the horizontal decimation factor and $mv_x$ as the half pixel horizontal motion vector of the original image frame, the address of the top left pixel of the motion block in the original image frame, denoted as XH in the half pixel unit, is given by (1):

$$XH = 2x + mv_x \quad (1)$$

The pixel corresponding to the motion block starts in the down-sampled image, whose address is denoted as x* and y* in the pixel unit given in (2).

$$x^* = \frac{XH}{2 \cdot Dx}; \quad y^* = y \quad (2)$$

Because the exemplary DCT filter 216 and down sampling processor 232 only reduce the horizontal components of the image, the vertical component of the motion vector is not affected. For the chrominance, the motion vector is a half of a luminance motion vector in the original picture. Therefore, definitions for translating the chrominance motion vector may also use the two equations (1) and (2).

Motion prediction is done by a two step process: first, pixel accuracy motion estimation in the original image frame restored by up-sampling the downsampled image frame in the up-sampling processor 226 of FIG. 2, then the half-pixel generator 228 performs a half pixel motion estimation by averaging of nearest pixel values.

Subpixels in a decimated picture, which correspond to pixels in an original picture, are interpolated, for example, using an up-sampling polyphase filter in the up-sampling processor 226, which gives a motion prediction in the original picture. The motion prediction is added, in adder 230, to an output signal of the IDCT processor 218. Since the output values of the adder 230 correspond to a reduced-resolution image in the original picture format, these values may be downsampled for display on a display having the lower resolution. Downsampling in the down sampling processor 232 is substantially equivalent to subsampling of an image frame, but adjustments may be made based upon the conversion ratio. For example, in the case of 3:1 downsampling, the number of horizontally downsampled pixels are 6 or 5 for each input macroblock, and the first downsampled pixels are not always the first pixel in the input macroblock.

After acquiring the correct motion prediction block from the downsampled image, up-sampling is performed to get the corresponding prediction block in the original picture. Consequently, subpixel accuracy in motion block prediction is desirable in the down sampled picture. For example, using 3:1 decimation, it is desirable to have ⅓ (or ⅙) subpixel accuracy in the motion prediction. The subpixel which is a first pixel required by the motion vector, in addition to the downsampled motion block, is determined. Then, subsequent subpixel positions are determined using modulo arithmetic as described in the following. The subpixel positions are denoted as $x_s$ as given in (3):

$$X_s = \left(\frac{XH}{2}\right) \% (Dx) \quad (3)$$

where "%" represents modulo division.

Figure 3A:
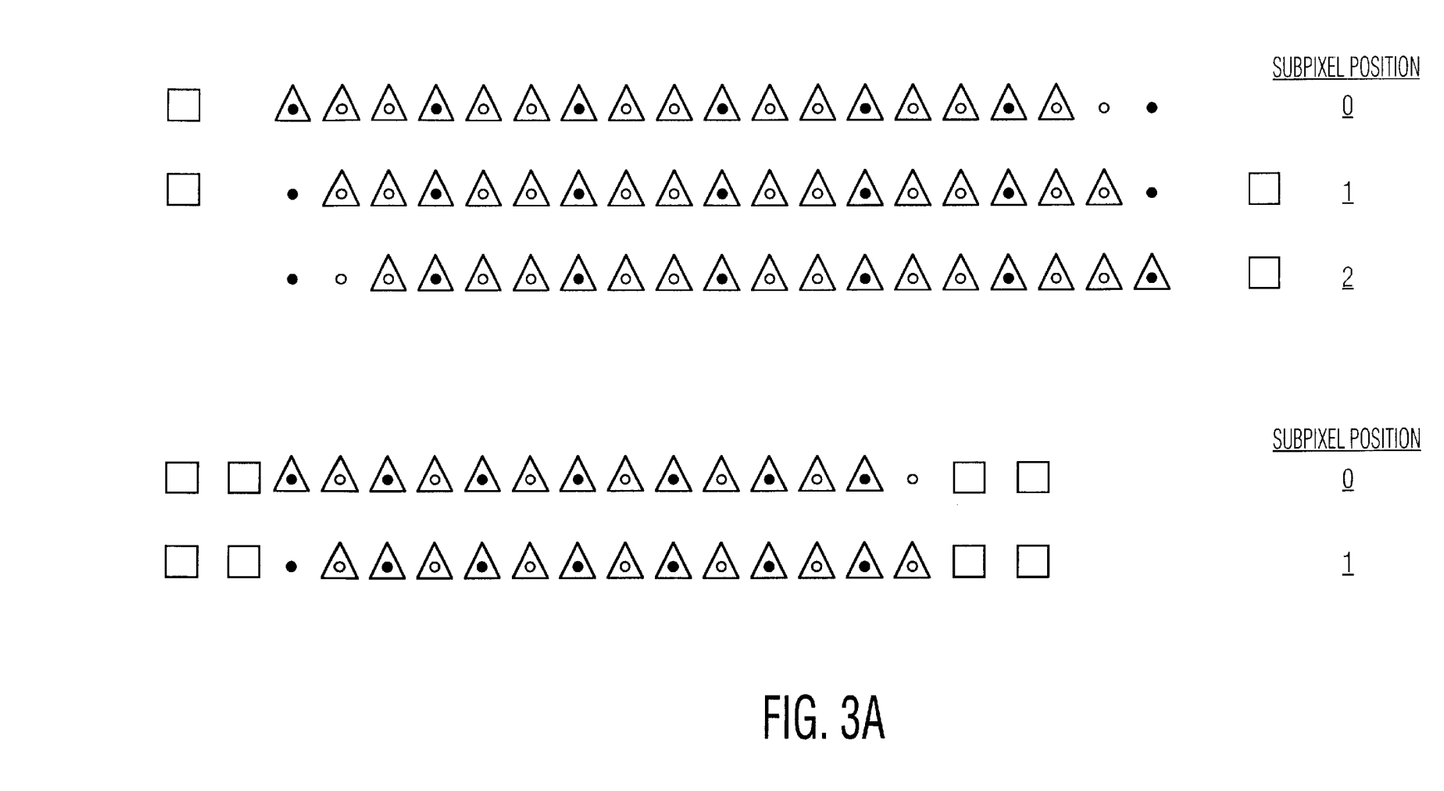
FIG. 3A illustrates subpixel positions and corresponding predicted pixels for exemplary embodiments of 3:1 and 2:1 down conversion systems.

For example, the ranges of $x_s$ are 0, 1, 2 for 3:1 up-sampling and 0, 1 for 2:1 up-sampling. FIG. 3A shows subpixel positions and corresponding 17 predicted pixels for the 3:1 and 2:1 examples, and Table 1 gives the legend for FIG. 3A.

TABLE 1

| Symbol | Pixel |
|---|---|
| ● | Downsampled Pixel |
| ▲ | Upsampled Pixel |
| ○ | Prediction Pixel |
| □ | Extra Right and Left Pixels for Upsampling |

As previously described, the up-sampling filters may be up-sampling polyphase filters, and Table 2A gives characteristics of these up-sampling polyphase interpolation filters.

TABLE 2A

|  | 3:1 Up-sampling | 2:1 Up-sampling |
|---|---|---|
| Number of Polyphase Filters | 3 | 2 |
| Number of Taps | 3 | 5 |
| Maximum number of horizontal downsampled pixels | 9 | 13 |

Tables 2B and 2C below, show polyphase filter coefficients for the exemplary 3:1 and 2:1 up-sampling polyphase filters.

TABLE 2B

3:1 Up-sampling Filter

|  | Phase 0 | Phase 1 | Phase 2 |
|---|---|---|---|
| Double Precision | −0.1638231735591 0.7900589359512 0.3737642376078 | 0.0221080691070 0.9557838617858 0.0221080691070 | 0.3737642376078 0.7900589359512 −0.1638231735591 |
| Fixed Point (9 bits) | −0.1640625 (−42) 0.7890625 (202) 0.3750000 (96) | 0.0234375 (6) 0.95703125 (244) 0.0234375 (6) | 0.3750000 (96) 0.7890625 (202) −0.1640625 (−42) |

TABLE 2C

2:1 Up-sampling Filter

|  | Phase 0 | Phase 1 |
|---|---|---|
| Double Precision | 0.0110396839260 0.0283886402920 0.9211433515636 0.0283886402920 0.0110396839260 | −0.1433363887113 0.6433363887113 0.6433363887113 −0.1433363887113 0.0000000000000 |
| Fixed Point (9 bits) | 0.01718750 (3) 0.02734375 (7) 0.92187500 (236) 0.02734375 (7) 0.01718750 (3) | −0.14453125 (−37) 0.64453125 (165) 0.64453125 (165) −0.14453125 (−37) 0.00000000 (0) |

In a fixed point representation, the numbers in parenthesis of Table 2B and Table 2C are 2's complement representations in 9 bits with the corresponding double precision numbers on the left. Depending upon the subpixel position of the motion prediction block in the downsampled reference image frame, one corresponding phase of the polyphase interpolation filter is used. Also, in an exemplary embodiment, more pixels on the left and right are needed to interpolate 17 horizontal pixels in the downsampled image frame. For example, in the case of 3:1 decimation, there are a maximum of 6 horizontally downsampled pixels for each input macroblock. However, when up-sampling, 9 horizontal pixels are needed to produce the corresponding motion prediction block values because an up-sampling filter requires more left and right pixels outside of the boundary for the filter to operate. Since the exemplary embodiment employs half pixel motion estimation, 17 pixels are needed to get 16 half pixels which can be either the first 16 integer pixels or the average values of nearest two pixel values. A half pixel motion generator takes care of this. Table 3 illustrates mapping between subpixel positions and polyphase filter elements, and a number of left pixels which are needed in addition for the up-sampling process.

TABLE 3

| | Sub Pixel Position | Polyphase | No. of Extra Left Pixels | Coordinate Change |
|---|---|---|---|---|
| 3:1 Up-sampling | 0 | 1 | 1 | x -> x - 1 |
| | 1 | 2 | 1 | x -> x - 1 |
| | 2 | 0 | 0 | |
| 2:1 Up-sampling | 0 | 0 | 2 | x -> x - 2 |
| | 1 | 1 | 2 | x -> x - 2 |

Figure 3B:
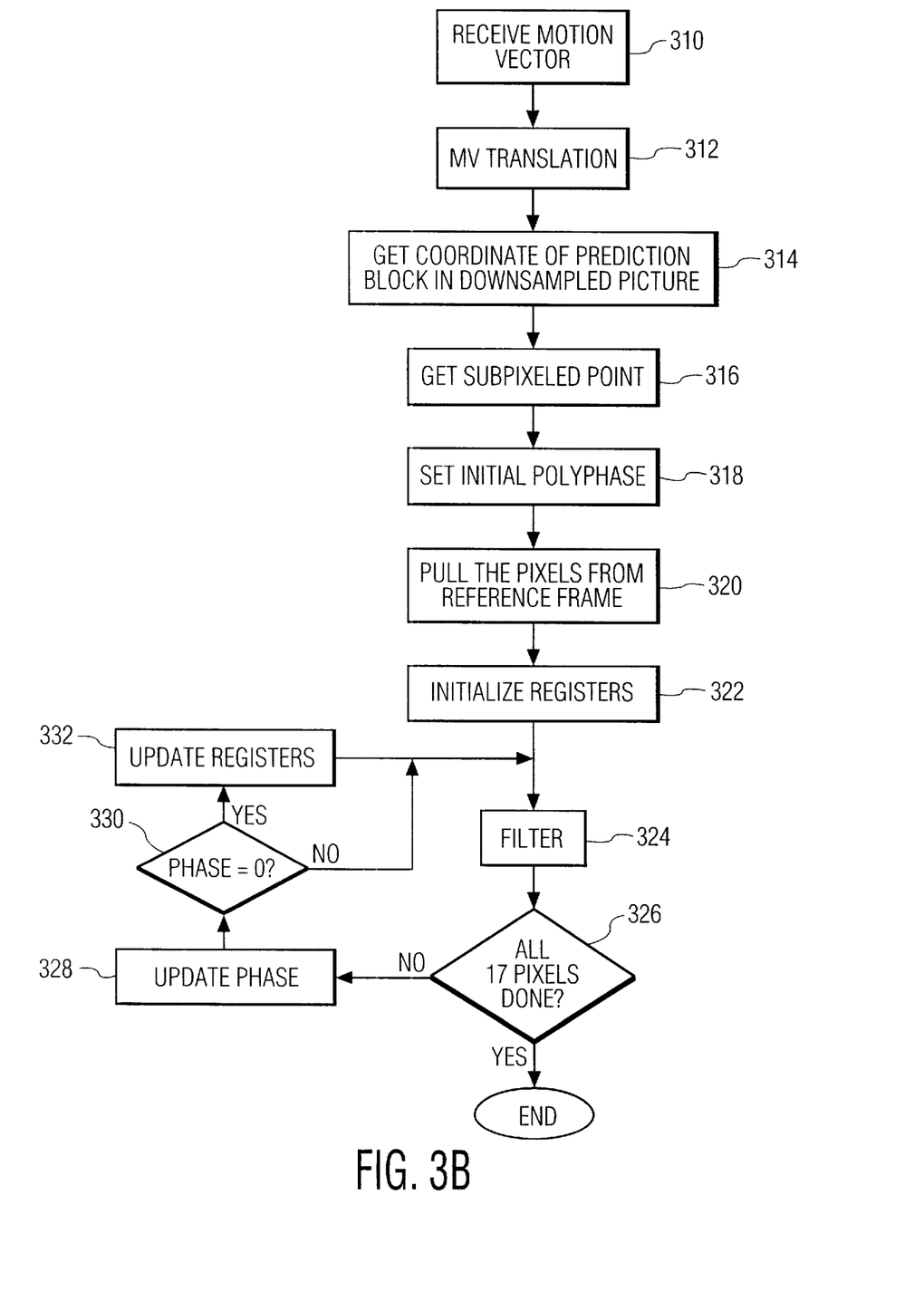
FIG. 3B shows the up-sampling process which is performed for each row of an input macroblock for an exemplary down conversion system.

FIG. 3B summarizes the up-sampling process which is performed for each row of an input macroblock. First, in step 310, the motion vector for the block of the input image frame being processed is received. At step 312, the motion vector is translated to correspond to the downsampled reference frame in memory. At step 314, the scaled motion vector is used to retrieve the coordinates of the prediction block stored in frame memory. At step 316 the subpixel point for the block is determined and the initial polyphase filter values for up-sampling are then retrieved at step 318. The identified pixels for the prediction block of the stored downsampled reference frame are then retrieved from memory at step 320.

Before the first pass at the filtering step 324, the registers are initialized at step 322, which for the exemplary embodiment entails loading the registers with the initial 3 or 5 pixel values. Then, after filtering step 324, the process determines at step 326 whether all pixels have been processed. In the exemplary embodiment 17 pixels are processed. If all pixels have been processed, the up-sampled block is complete. If all pixels have not been processed, the phase is updated at step 328, and the phase is checked, for the 0 value. In one embodiment of the invention, if the phase is zero, the registers are updated for the next set of polyphase filter coefficients. Updating registers step 332 then simply updates the input pixels. In an exceptional case where the left-most pixel is outside of the block boundary, a previous pixel value may be repeated.

C. DCT Domain Filtering Employing Weighting of DCT Coefficients

The exemplary embodiment of the down conversion system includes the DCT filter 216 processing the DCT coefficients in the frequency domain, which replaces a lowpass filter in the spatial domain. There are several advantages in DCT domain filtering instead of spatial domain filtering for DCT coded pictures, such as contemplated by the MPEG or JPEG standards. Most notably, a DCT domain filter is computationally more efficient and requires less hardware than a spatial domain filter applied to the spatial pixels. For example, a spatial filter having N taps may use as many as N multiplications and additions for each spatial pixel value. This compares to only one multiplication in the DCT domain filter.

The simplest DCT domain filter is a truncation of the high frequency DCT coefficients. However, truncation of high frequency DCT coefficients does not result in a smooth filter and has drawbacks such as "ringing" near edges in the decoded picture. The DCT domain lowpass filter of the exemplary embodiment of the invention is derived from a block mirror filter in the spatial domain. The filter coefficient values for the block mirror filter are, for example, optimized in the spatial domain, and these values are then converted into coefficients of the DCT domain filter.

Although the exemplary embodiment shows DCT domain filtering in only the horizontal direction, DCT domain filtering can be done in either the horizontal or the vertical direction or both by combining horizontal and vertical filters.

D. Derivation of the DCT Domain Filter Coefficients

One exemplary filter of the present invention is derived from two constraints: first, the filter processes image data on a block by block basis for each block of the image without using information from other blocks of the same picture or from previous pictures; and second, the filter reduces visibility of block boundaries which occur when the filter processes boundary pixel values.

According to the first constraint, in the DCT based compression of an MPEG image sequence, for example, blocks of N×N DCT coefficients yield blocks of N×N spatial pixel values. Consequently, an exemplary embodiment of the present invention implements a DCT domain filter which only processes blocks of the currently received picture.

According to the second constraint, if the filter is simply applied to a block of spatial pixel values, there is a transition of filtering on the block boundary which is caused by an insufficient number spatial pixel values beyond the boundary to fill the residual of the filter. That is to say, the edge of a block cannot be properly filtered because the N-tap filter has respective input pixels for only N/2 or for (N/2)−1 taps depending upon whether N is even or odd. The remaining input pixels are beyond the boundary of the block. Several methods of supplying pixel values exist: 1) repeat a predetermined constant pixel value beyond a boundary; 2) repeat the same pixel value as the boundary pixel value; and 3) mirror the pixel values of the block to form previous and subsequent blocks of pixel values adjacent to the processed block. Without prior information on the contents of the previous or subsequent block, the mirroring method is considered as a preferred method. Therefore, an embodiment of the present invention employs this mirroring method for the filter and is termed a "block mirror filter."

The following describes an exemplary embodiment which implements a horizontal block mirror filter that lowpass filters 8 input spatial pixel values of a block. If the size of the input block is an 8×8 block matrix of pixel values, then a horizontal filtering can be done by applying the block mirror filter to each row of 8 pixel values. It will be apparent to one skilled in the art that the filtering process can be implemented by applying the filter coefficients columnwise of the block matrix, or that multidimensional filtering may be accomplished by filtering of the rows and then filtering the columns of the block matrix.

Figure 4:
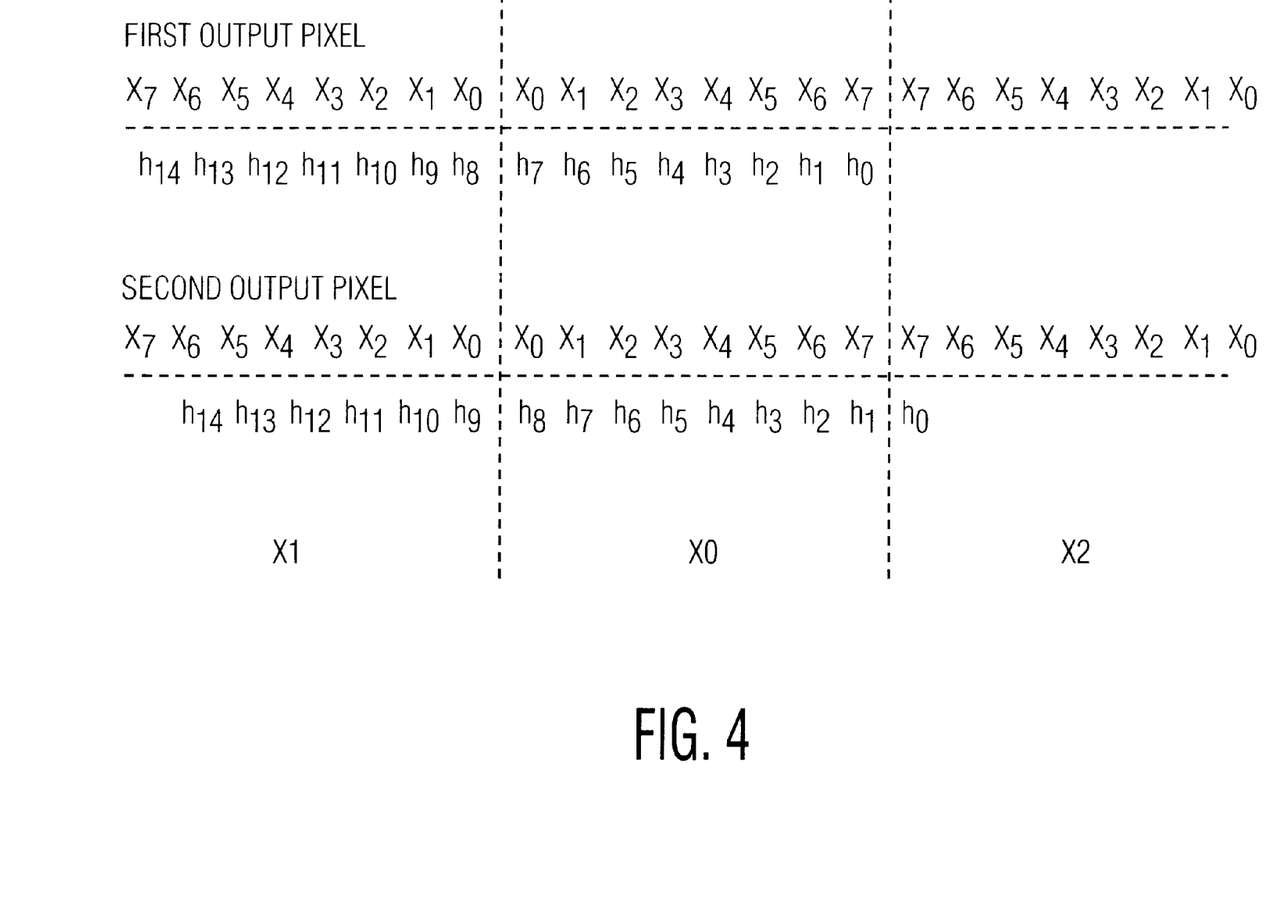
FIG. 4 illustrates the multiplication pairs for the first and second output pixel values of an exemplary embodiment of a block mirror filter.

FIG. 4 shows the correspondence between the input pixel values $x_0$ through $x_7$ (group X0) for an exemplary mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filter tap values with the corresponding pixel values. FIG. 4 illustrates the multiplication pairs for the first and second output pixel values.

The following shows that the block mirror filter in the spatial domain is equivalent to DCT domain filter. The mirror filtering is related to a circular convolution with 2N points (N=8).

Define the vector x' as shown in equation (4).

$$x'(n) = x(N) + x(2N-1-n); \quad (4)$$

$0 <= n <= 2N-1$

In the case of N=8, $$x' = (x_0, x_1, x_2, x_3, x_4, x_5, x_6, x_7, x_7, x_6, x_5, x_4, x_3, x_2, x_1, x_0)$$

Rearranging the filter tap values $h_0$ through $h_{14}$, and denoting the rearranged values by h'

$$h' = (h_7, h_8, h_9, h_{10}, h_{11}, h_{12}, h_{13}, h_{14}, 0, h_0, h_1, h_2, h_3, h_4, h_5, h_6)$$

Therefore, the mirror filtered output y(n) is a circular convolution of x'(n) and h'(n) which is given by equation (5).

$$y(n) = x'(n) \otimes h'(n) \quad (5)$$

Which is equivalent to equation (6).

$$y(n) = \sum_{k=0}^{2N-1} x'[n-k] \cdot h'(n) \quad (6)$$

where x'[n−k] is a circular modulo of x'(n) and x'[n]=x'(n) for n>=0 x'[n]=x'(n+2N) for n<0.

It is known that the circular convolution in the spatial domain shown in equation (5) corresponds to the scalar multiplication in the Discrete Fourier Transform (DFT) domain. Defining Y(k) as the DFT of y(n), then equation (5) becomes equation (7) in the DFT domain.

$$Y(k) = X'(k) \cdot H'(k) \quad (7)$$

where X'(k) and H'(k) are the DFTs of x'(n) and h'(n) respectively.

Equations (4) through (7) are valid for a filter with a number of taps less than 2N. In addition, the filter is limited to be a symmetric filter with odd number of taps, with these constraints H'(k) is a real number. Therefore, X'(k), the DFT of x'(n), can be weighed with a real number H'(k) in the DFT frequency-domain instead of 2N multiplication and 2N addition operations in the spatial domain to implement the filtering operation. The values of X'(k) are very closely related to the DCT coefficients of the original N-point x(n), because an N-point DCT is obtained by the 2N-point DFT of x'(n) which is the joint sequence composed of x(n) and its mirror, x(2N−1−n).

The following describes the derivation of the DFT coefficients of the spatial filter, H'(k), by assuming a symmetric filter having an odd number of taps, 2N−1, which is h(n)=h(2N−2−n), and equivalently h'(n)=h'(2N−n) and h'(N)=0. Define H'(k) as in equation (8).

$$H'(k) = \sum_{n=0}^{2N-1} h'(n) \cdot W_{2N}^{kn} = h'(0) + 2 \sum_{n=1}^{N-1} h'(n) \cdot \cos\pi \frac{kn}{N} \quad (8)$$

where $W_{2N}^{kn} = \exp\{-2\pi kn/(2N)\}$; and H'(k)=H'(2N−k).

It is known that the 2N-point DFT of x'(n), X'(k), can be expressed by its DCT coefficients in equation (9).

$$X'(k) = \sum_{n=0}^{2N-1} x'(n) \cdot W_{2N}^{kn} = W_{2N}^{-k/2} \cdot \sum_{n=1}^{N-1} 2x(n) \cdot \cos\pi \frac{k(2n+1)}{2N} \quad (9)$$

whereas the DCT coefficient of x(n), C(k), is given by equation (10).

$$C(k) = \sum_{n=1}^{N-1} 2x(n) \cdot \cos\pi \frac{k(2n+1)}{2N} = W_{2N}^{k/2} \cdot X'(k) \quad (10)$$

for $0 \leq k \leq N-1$ and C(k)=0 elsewhere.

The values of X'(k), the DFT coefficients of x'(n), can be expressed by C(k), the DCT coefficients of x'(n) by the matrix of equation (11).

$$X'(k) = \begin{bmatrix} W_{2N}^{-k/2} \cdot C(k) & \text{for} & k \leq N-1 \\ 0 & \text{for} & k = N \\ -W_{2N}^{-k/2} \cdot C(2N-k) & \text{for} & N+1 \leq k \leq 2N-1 \end{bmatrix} \quad (11)$$

The original spatial pixel values, x(n), can be also obtained by IDCT (Inverse Discrete Cosine Transformation) shown in equation (12).

$$x(n) = \sum_{k=0}^{N-1} \alpha(k) \cdot C(k) \cdot \cos\pi \frac{k(n+1/2)}{N} \quad (12)$$

where $\alpha(k)=\frac{1}{2}$ for k=0 and 1 otherwise.

The values of y(n) for 0<=n<=N−1, are obtained by IDFT of X'(k)H'(k) given in (13):

$$y(n) = \frac{1}{2N} \cdot \left\{ \sum_{k=0}^{2N-1} X'(k) \cdot H'(k) \cdot W_{2N}^{-kn} \right\} \quad (13)$$

$$= \frac{1}{2N} \left\{ \sum_{k=0}^{N-1} C(k) \cdot H'(k) \cdot W_{2N}^{-k(n+1/2)} + \sum_{k=N+1}^{2N-1} -C(2N-k) \cdot H'(2N-k) \cdot W_{2N}^{-k(n+1/2)} \right\}$$

$$= \frac{1}{N} \sum_{k=0}^{N-1} \alpha(k) \cdot \{C(k) \cdot H'(k)\} \cdot \cos\pi \frac{k(n+1/2)}{N}$$

The values y(n) of equation (13) are the spatial values of the IDCT of C(k)H'(k). Therefore, the spatial filtering can be replaced by the DCT weighting of the input frequency-domain coefficients representing the image block with H'(k) and then performing the IDCT of the weighted values to reconstruct the filtered pixel values in the spatial domain.

E. Exemplary Embodiment of the Block Mirror Filter

One embodiment of the exemplary block mirror filtering of the present invention is derived as by the following steps: 1) a one dimensional lowpass symmetric filter is chosen with an odd number of taps, which is less than 2N taps; 2) the filter coefficients are increased to 2N values by padding with zero's; 3) the filter coefficients are rearranged so that the original middle coefficient goes to the zeroth position by a left circular shift; 4) the DFT coefficients of the rearranged filter coefficients are determined; 5) the DCT filter coefficients are multiplied with the real number DFT coefficients of the input block; and 6) the inverse discrete cosine transform (IDCT) of the filtered DCT coefficients is performed by multiplying by IDCT coefficients to provide a block of lowpass-filtered pixels prepared for decimation.

The cutoff frequency of the lowpass filter is determined by the decimation ratio. For one exemplary embodiment, the cutoff frequency is π/3 for a 3:1 decimation and π/2 for a 2:1 decimation, where π is one-half of the sampling frequency.

A DCT domain filter in MPEG and JPEG decoders allows memory requirements to be reduced because the inverse quantizer and IDCT processing of blocks already exists in the decoder of the prior art, and only the additional scalar multiplication of DCT coefficients by the DCT domain filter coefficients is required. Therefore, a separate DCT domain filter block multiplication is not physically required in a particular implementation; another embodiment of the present invention simply combines the DCT domain filter coefficients with the IDCT processing coefficients.

For the exemplary down conversion system of the present invention, the horizontal filtering and decimations of the DCT coefficients were considered; and the following are two exemplary implementations for:

1. 1920H by 1080V interlace to 640H by 1080V interlace conversion (Horizontal 3:1 decimation).
2. 1280H by 720V progressive to 640H by 720V progressive conversion (Horizontal 2:1 Decimation)

Table 4 shows the DCT block mirror filter (weighting) coefficients; in Table 4 the numbers in the parenthesis are 10 bit 2's complementary representations. The "*" of Table 4 implies an out of bound value for the 10 bit 2's complement representation because the value is more than 1; however, as is known by one skilled in the art, the multiplication of the column coefficients of the block by the value indicated by the * can be easily implemented by adding the coefficient value to the coefficient multiplied by the fractional value (remainder) of the filter value.

TABLE 4

| | 3:1 Decimation | 2:1 Decimation |
|---|---|---|
| H[0] | 1.000000000000000 (511) | 1.0000000000000000 (511) |
| H[1] | 0.986934590759779 (505) | 1.0169628157945179 (*) |
| H[2] | 0.790833583171840 (405) | 1.0000000000000000 (511) |
| H[3] | 0.334720213357461 (171) | 0.82247656390475166 (421) |
| H[4] | −0.03234633361027473 (−17) | 0.46728234862006007 (239) |
| H[5] | −0.0377450036954524 (−19) | 0.10634261847436199 (54) |
| H[6] | −0.0726889747390758 (37) | −0.052131780559049545 (−27) |
| H[7] | 0.00954287167337307 (5) | −0.003489737967467715 (−2) |

These horizontal DCT filter coefficients weight each column in the block of 8×8 DCT coefficients of the encoded video image. For example, the DCT coefficients of column zero are weighted by H[0], and the DCT coefficients of first column is weighted by H[1] and so on.

The above discussion illustrates a horizontal filter implementation using a one-dimensional DCT. As is known in the digital signal processing art, such processing can be extended to two-dimensional systems. For a two-dimensional system, the input sequence is now represented as a matrix of values, showing the sequence to be periodic in the column sequence with period M, and periodic in the row sequence with period N, N and M being integers. A two-dimensional DCT can be implemented as a one dimensional DCT performed on the columns of the input sequence, and then a second one dimensional DCT performed on the rows of the DCT processed input sequence. Also, as is known in the art, a two-dimensional IDCT can be implemented as a single process.

F. Down Sampling

Figure 5A:
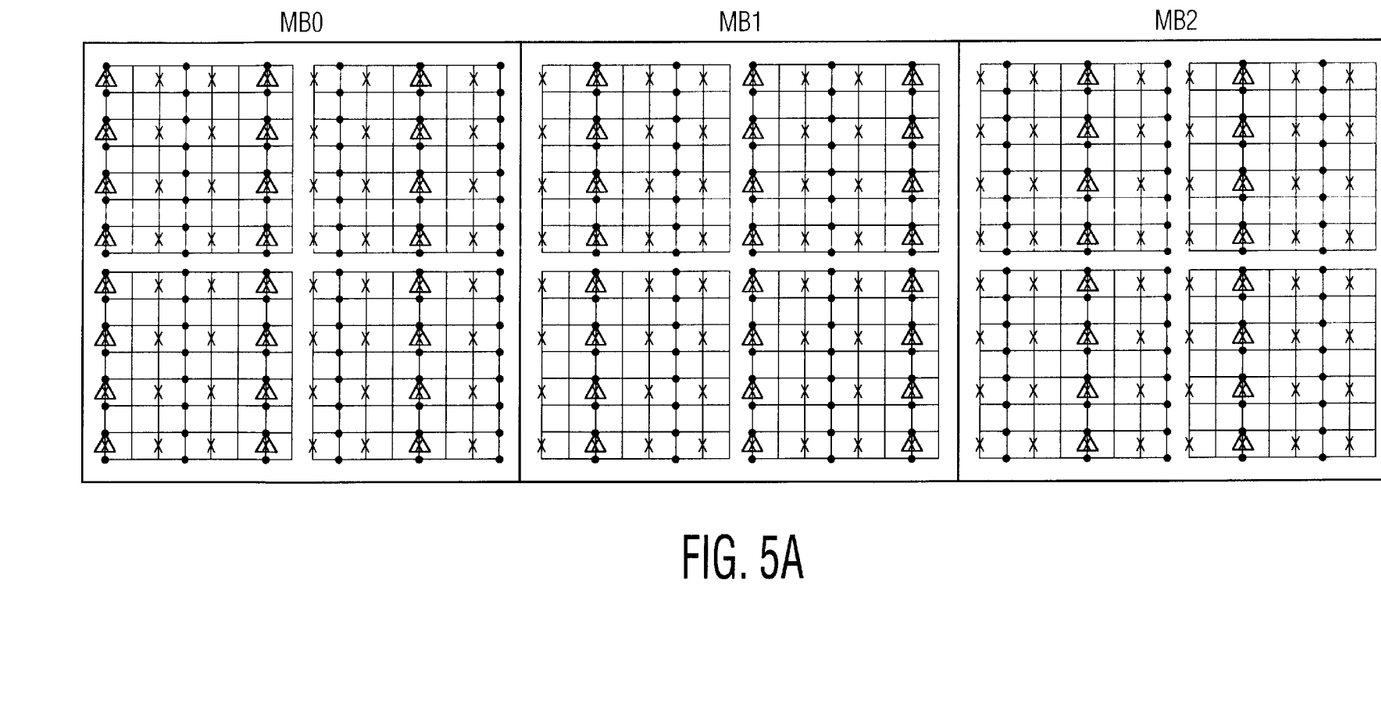
FIG. 5A shows input and decimated output pixels for 4:2:0 video signal using 3:1 decimation.
Figure 5B:
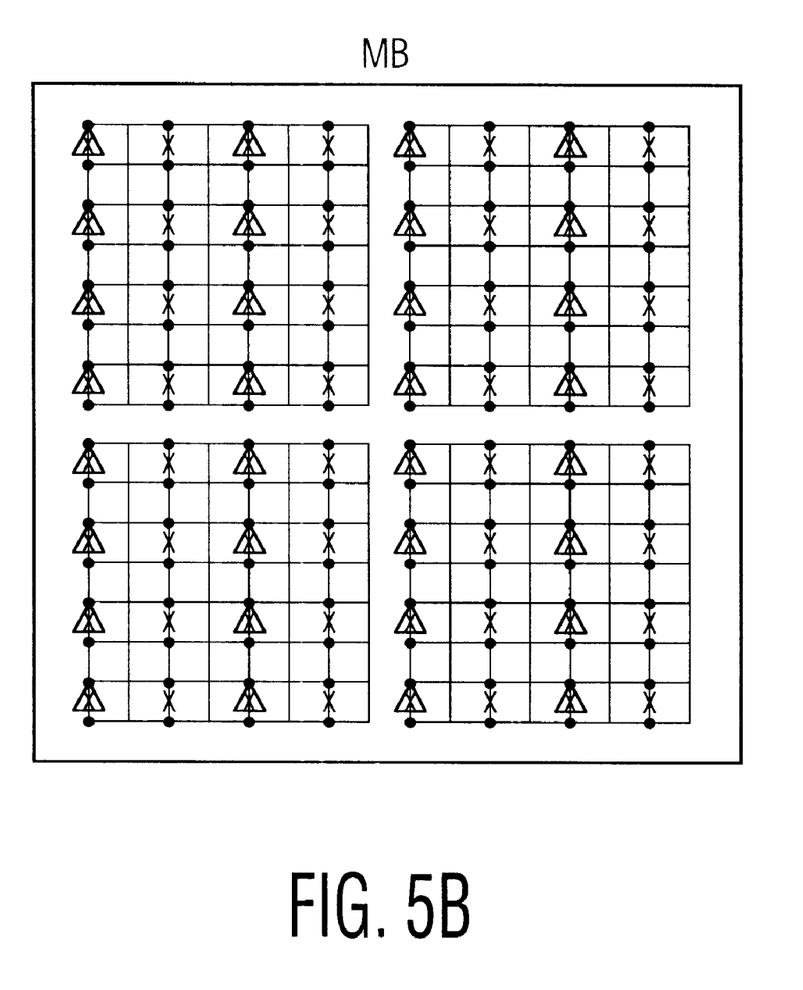
FIG. 5B shows input and decimated output pixels for 4:2:0 video signal using 2:1 decimation.

Down sampling is accomplished by the down sampling processor 232 to reduce the number of pixels in the down-converted image. FIG. 5A shows the input and decimated output pixels for 4:2:0 chrominance type for 3:1 decimation. FIG. 5B shows the input and decimated output pixels for 4:2:0 chrominance type 2:1 decimation. Table 5 gives the legend identification for the Luminance and Chrominance pixels of FIG. 5A and FIG. 5B. The pixel positions before and after the down conversion of FIGS. 5A and 5B are the interlaced (3:1 decimation) and progressive (2:1 decimation) cases respectively

TABLE 5

| Symbol | Pixel |
|---|---|
| + | Luminance Before Decimation |
| x | Chrominance Before Decimation |
| ● | Luminance After decimation |
| Δ | Chrominance After Decimation |

For down sampling of the interlaced image, which may be the conversion from a 1920 by 1080 pixel size to a 640 by 1080 pixel size, every third pixel is decimated on the horizontal axis. For the exemplary 3:1 decimation, there are three different macroblock types after the down conversion process. In FIG. 5A, original macroblocks (MBs) were denoted by MB0, MB1, MB2. The down sampled luminance pixels in MB0 start at the first pixel in the original macroblock, but in MB1 and MB2 the down-sampled pixels start at the third and the second pixels. Also the number of down-sampled pixels in each macroblock are not the same. In MB0, there are 6 down-sampled pixels horizontally, but 5 pixels in MB1 and MB2. These three MB types are repeating, therefore Modulo 3 arithmetic is to be applied. Table 6 summarizes the number of downsampling pixels and offsets for each input macroblock MB0, MB1, MB2.

TABLE 6

| | MB0 | MB1 | MB2 |
|---|---|---|---|
| No. of Down Sampled Luminance Pixels | 6 | 5 | 5 |
| No. of Down Sampled Chrominance Pixels | 3 | 3 | 2 |
| Offset of 1st Down Sampled Luminance Pixel | 0 | 2 | 1 |
| Offset of 1st Down Sampled Chrominance Pixel | 0 | 1 | 2 |

For downsampling of the progressive format image, which may be the conversion from a 1280 by 720 pixel size to a 640 by 720 pixel size, the luminance signal is sub-sampled for every second sample horizontally. In other words, every second pixel is decimated on the horizontal axis. For the chrominance signal, the down-sampled pixel is just a half pixel below the original pixel. The pixels in the original macroblock and the decimated pixels are shown in FIG. 5B.

G. Robust Down Conversion Using a Pre-Decimation Filter

The lowpass filtering performed by the DCT filter 216 reduces aliasing distortion in an output image. In an exemplary embodiment of the present invention, this filter operation is performed on an intra-block basis. When the DCT filter 216 filters on an intra-block basis, the filtering is performed without consideration of coefficient values corresponding to blocks adjacent to the block being filtered. This may result in down conversion artifacts due to non-smooth filtering at block boundaries. These down conversion artifacts may be visible in an output image when original image consists of a moving scene having fine detail and when there is slow panning and zooming.

As described in section II.D., a block mirror filter may be used to supply pixel values for the pixel values that are beyond the boundary of a block. A block mirror filter is same as an FIR filter at pixels in the middle of the DCT block, but it is different at a block boundary because it assumes left and right pixels beyond a block as mirrored and then filters these input pixels to get a low pass output. This nonuniformity at a block boundary may affect the down converted picture block to block and a frame to frame. It is specially noticeable if the picture has a slow panning or zooming with fine detail.

The pre-decimation filter 240 may be used to reduce block boundary artifacts caused by intra-block filtering by the DCT filter 216. In an exemplary embodiment, the pre-decimation filter 240 filters pixels on an inter-block basis and has a frequency response characterized with a cutoff frequency of $\pi/3$ in a 3:1 decimation case and $\pi/2$ in a 2:1 decimation case where $\pi$ is one-half of the sampling frequency.

In a down-conversion system as shown in FIG. 2, there is a residual DCT signal path and there is a motion prediction signal path. The pre-decimation filter 240 results in a motion predicted signal being low pass filtered twice. First it is low pass filtered when it is upsampled by the up-sampling processor 226 and then it is low passed again after the adder 230 by the pre-decimation filter 240.

Low pass filtering of an image twice may result in an undesirable drop in image resolution as an image progresses from an intra-coded frame to the next intra-coded frame. The reduced image resolution will be greater as the number of forward predicted frames (P-frames) between intra-coded frames in the coding scheme increases.

This drop in image resolution may be reduced by distributing the desired filtering characteristics between the up-sampling filter 226 and the pre-decimation filter 240 as illustrated by equation (14) below, for example:

$$h(n)=h\_up(n)*h\_dec(n) \quad (14)$$

where * means a convolution. In equation (14), h(n) represents the characteristics of a filter having the desired filtering characteristics and is a convolution of the up-sampling filter 226 characteristics represented by h_up(n), and the pre-decimation filter 240 characteristics represented by h_dec(n).

When the coding structure consists of many predicted frames between intra-coded frames, reproduction of a slow moving or slow zooming image in the down converted picture may result in the predicted frames having motion artifacts. These motion artifacts may result in the predicted frames being ahead of or behind of the true motion. When the next intra-coded frame is displayed, the difference between the down converted predicted picture having motion artifacts and the accurately represented intra-coded picture may result in non-smooth or jerky motion that may be visible to a viewer.

In an exemplary embodiment, the filter represented by h(n) in equation (14) above is a Lagrangian filter which is derived from Lagrange interpolations. Lagrangian interpolations are well known to those skilled in the art and are taught by Atkinson, An Introduction to Numerical Analysis, 107–10 (1978), which is incorporated herein by reference. The inventor has discovered that using a Lagrangian filter reduces the motion artifacts compared to using an equi-ripple filter.

With regard to the residual DCT signal path, without a DCT domain filter 216 shown in FIG. 2, the residual signal is only low pass filtered by the pre-decimation filter 240. The pre-decimation filter 240 only partially filters the signal in comparison to the combination of the up-sampling filter 226 and the pre-decimation filter 240, and the residual DCT component may not be low pass filtered enough to sufficiently reduce aliasing distortion. When a DCT domain filter 216 is used in combination with a pre-decimation filter 240, the DCT domain filter 216 provides additional low pass filtering to further reduce aliasing distortion.

In an exemplary embodiment, the DCT domain filter 216 is designed to be equivalent to a spatial domain filter in the up-sampling processor 226. This results in nearly equivalent filtering of both the residual signal component and the motion predicted signal component. The equivalence is limited due to the DCT domain filter 216 filtering on a intra-block basis.

An exemplary embodiment of a horizontal 3:1 down conversion system having both a DCT domain filter 216 and a pre-decimation filter 240 is described below. The teachings of this embodiment may be applied by one skilled in the art to other dimensions and other scaling ratios.

The up-sampling processor 226 in the example below may be implemented by padding two zeros for each input pixel value and then low pass filtering the pixels using an interpolation filter with a cutoff frequency of $\pi/3$ where $\pi$ equals one-half of the sampling frequency. As known to those skilled in the art, the teachings of the present invention may also be applied to a down conversion system having an up-sampling processor 226 implemented using a poly-phase filter which operates on the down sampled pixels directly and the number of phases depends on the subpixel positions to be interpolated.

In this exemplary embodiment of the present invention, a down conversion system has a DCT domain filter 216 and a pre-decimation filter 240. The desired filtering characteristic h(n) is shown below in equation (15):

$$h(n)=(-13,-16, 0, 95, 190, 256, 190, 95, 0, -16, -13)/256 \quad (15)$$

Figure 6:
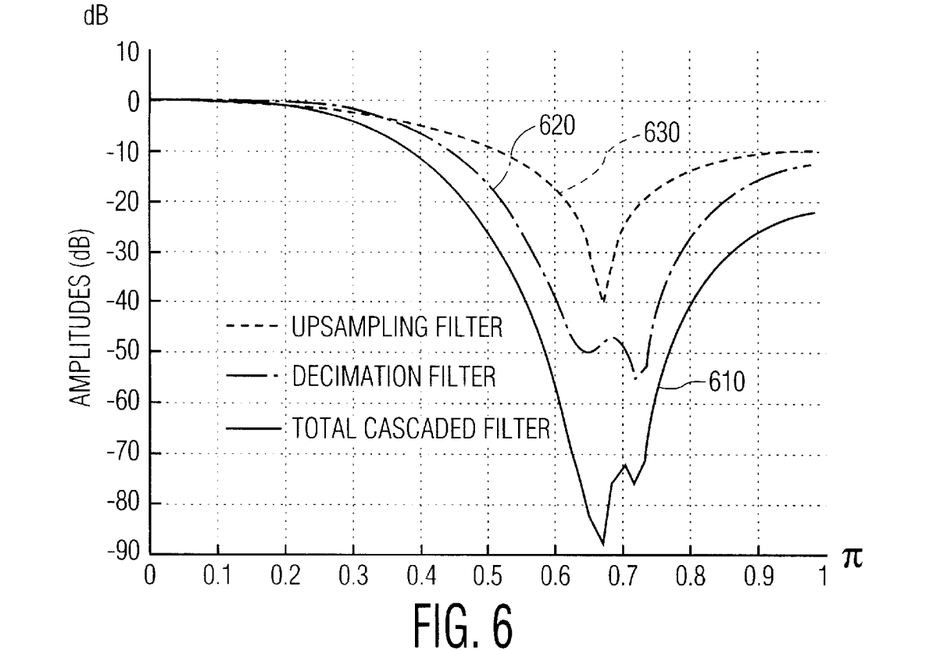
FIG. 6 shows the frequency response characteristics of an up-sampling filter, a pre-decimation filter and their cascaded response for a horizontal 3:1 down conversion system.

The frequency response (dB vs. frequency, where $\pi$ is one-half of the sampling frequency) of a filter having the characteristic h(n) shown in equation (15) above is illustrated by curve 610 in FIG. 6. The filter characteristic h(n) may be represented as the convolution of the characteristics of two filters as shown in equation (16) below:

$$h(n)=h\_up(n)*h\_dec(n)=*(1,1,1)*(-13,-3, 16, 82, 92, 82, 16, -3, -13)/256 \quad (16)$$

where * means a convolution.

Either the up-sampling filter 226 or the pre-decimation filter 240 may have the (1,1,1) filtering characteristic. When the up-sampling filter 226 is represented by the characteristic (1,1,1), which is equivalent to repeating a down sampled pixel twice, it is simple to implement. This results in the pre-decimation filter 240 having the filtering characteristic h_dec(n) as shown in equation (17) below:

$$h\_dec(n)=(-13,-3, 16, 82, 92, 82, 16, -3, -13)/256. \quad (17)$$

The frequency responses (dB vs. frequency) of the pre-decimation filter 240 characterized by h_dec(n) in equation (17) above and of the up-sampling filter 226 characterized by (1,1,1) are illustrated in FIG. 6 by curves 620 and 630, respectively.

In an exemplary embodiment, the DCT domain filter 216 has a filtering characteristic equivalent to that of the up-sampling processor 226. An equivalent spatial domain filter may be represented by h_sp(n) in equation (18) below:

$$h\_sp(n)=(1,1,1)/3. \quad (18)$$

As described above with respect to equations (8)–(13) and taught by Kim et. al., "DCT Domain Filter for ATV Down Conversion", IEEE Transactions on Consumer Electronics, Vol. 43 (4) 1074–8 (November 1997), which is incorporated herein by reference, the spatial domain filter represented by h_sp(n) in equation (18) may be implemented in the DCT domain by a symmetric filter with an odd number of taps having DCT domain filter coefficients H_DCT shown in equation (19) below:

$$H\_DCT=(1, 0.9493, 0.8047, 0.5885, 0.3333, 0.0782, -0.1381, -0.2826). \quad (19)$$

An exemplary embodiment of a horizontal 2:1 down conversion system having both a DCT domain filter 216 and a pre-decimation filter 240 is described below. The teachings of this embodiment may also be applied by one skilled in the art to other dimensions and other scaling ratios.

The up-sampling processor 226 in the example below may be implemented by padding one zero for each input pixel value and then low pass filtering the pixels using an interpolation filter with a cutoff frequency of π/2 where π equals one-half of the sampling frequency. As known to those skilled in the art, the teachings of the present invention may also be applied to a down conversion system having an up-sampling processor 226 implemented using a poly-phase filter which operates on the down sampled pixels directly and the number of phases depends on the subpixel positions to be interpolated.

In this exemplary embodiment of the present invention, a down conversion system has a DCT domain filter 216 and a pre-decimation filter 240. The desired filtering characteristic h(n) is shown in equation (20) below:

$$h(n)=(-1/16, 0, 9/16, 1, 9/16, 0, -1/16). \quad (20)$$

The frequency response (dB vs. frequency) of a filter having the characteristic h(n) shown above is illustrated by curve 710 in FIG. 7. The filter characteristic h(n) may be represented as the convolution of the characteristics of two filters as shown in equation (21) below:

$$h(n)=h\_up(n)*h\_dec(n)=(1/2,1,1/2)*(-1/8, 1/4, 3/4, 1/4, -1/8) \quad (21)$$

where * means a convolution.

In this exemplary embodiment, the up-sampling filter 226 and the pre-decimation filter 240 are characterized by h_up(n) and h_dec(n), respectively, as shown in equations (22) and (23) below:

$$h\_up(n)=(1/2,1,1/2) \quad (22)$$

$$h\_dec(n)=(-1/8, 1/4, 3/4, 1/4, -1/8). \quad (23)$$

Figure 7:
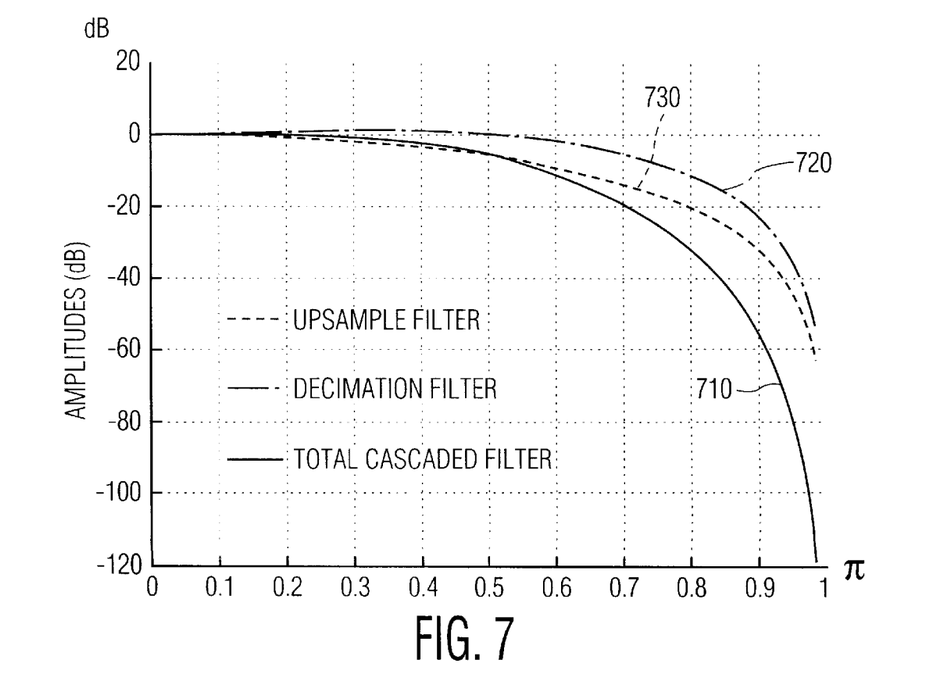
FIG. 7 shows the frequency response characteristics of an up-sampling filter, a pre-decimation filter and their cascaded response for a horizontal 2:1 down conversion system.

The frequency responses (dB vs. frequency) of the pre-decimation filter 240 characterized by h_dec(n) in equation (23) above and of the up-sampling filter 226 characterized by h_up(n) in equation (22) above are illustrated in FIG. 7 by curves 720 and 730, respectively.

In an exemplary embodiment, the DCT domain filter 216 has a filtering characteristic equivalent to that of the up-sampling processor 226. An equivalent spatial domain filter may be represented by h_sp(n) as defined by equation (24) below:

$$h\_sp(n)=(1/2,1,1/2)/2=(1/4, 1/2, 1/4). \quad (24)$$

As described above with respect to equations (8)–(13) and taught by Kim et. al., "DCT Domain Filter for ATV Down Conversion", IEEE Transactions on Consumer Electronics, Vol. 43 (4) 1074–8 (November 1997), the spatial domain filter represented by h_sp(n) may be implemented in the DCT domain by a symmetric filter with an odd number of taps having DCT domain filter coefficients H_DCT shown in equation (25) below:

$$H\_DCT=(1, 0.9619, 0.8536, 0.6913, 0.5000, 0.3087, 0.1464, 0.0381). \quad (25)$$

While exemplary embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the scope of the invention.

What is claimed:

1. An apparatus for forming a low resolution video signal from an encoded video signal representing a residual video image, the encoded video signal being a frequency-domain transformed high resolution video signal, the apparatus comprising:

means for receiving the encoded residual video signal as a plurality of blocks of high resolution frequency-domain video coefficient values, wherein the plurality of blocks comprises a macroblock;

down-conversion filtering means for weighting selected ones of the high resolution frequency-domain video coefficient values within each block to generate corresponding blocks of filtered frequency-domain video coefficients;

inverse-transform means for transforming each block of filtered frequency-domain video coefficients into a block of first-filtered pixel values;

summing means coupled to the inverse-transform means for adding the blocks of first-filtered pixel values to upsampled blocks of low resolution video signal pixel values to provide blocks of summed pixel values corresponding to the video image;

up-sampling filtering means coupled to receive blocks of low resolution video signal pixel values for converting the blocks of low resolution video signal pixel values into the upsampled blocks of low resolution video signal pixel values;

pre-decimation filtering means coupled to the summing means for filtering the summed pixel values across block boundaries to provide corresponding blocks of second-filtered pixel values; and decimating means for deleting selected ones of the second-filtered pixel values within each block to provide the blocks of low resolution video signal pixel values.

2. An apparatus for forming a low resolution video signal according to claim 1, wherein the decimating means provides a block of low resolution video signal pixel values corresponding to a reference frame of the video image and the inverse-transform means provides a block of first-filtered pixel values corresponding to the residual video image of a current frame of the video image, the apparatus further comprising:

memory means for storing the block of low resolution video signal pixel values corresponding to the reference frame provided by the decimation means;

wherein the pre-decimation filtering means filters the summed block of pixel values to provide a block of second-filtered pixel values corresponding to the current frame of the video image and the decimating means deletes selected ones of the block of second-filtered pixel values corresponding to the current frame of the video image and provides a block of low resolution video signal pixel values corresponding to the current frame of the video image.

3. An apparatus for forming a low resolution video signal according to claim 2, further comprising motion compensation means for converting the upsampled block of low resolution video signal pixel values corresponding to the reference frame into a motion compensated upsampled block of low resolution video signal pixel values corresponding to the reference frame wherein the summing means adds the motion compensated upsampled block of low resolution video signal pixel values corresponding to the reference frame to the block of first-filtered pixel values corresponding to the residual video image of the current frame to provide the summed block of pixel values corresponding to the current frame of the video image.

4. An apparatus for forming a low resolution video signal according to claim 1, wherein the down-conversion filtering means and the pre-decimation filtering means, combine to reduce aliasing distortion in the low resolution video signal.

5. An apparatus for forming a low resolution video signal according to claim 1, wherein the down-conversion filtering means is a block mirror filter.

6. An apparatus for forming a low resolution video signal according to claim 5, wherein the down-conversion filtering means performs intra-block processing on the plurality of high resolution frequency-domain video coefficient values and the pre-decimation filtering means performs inter-block processing on the summed block of pixel values corresponding to the current frame of the video image.

7. An apparatus for forming a low resolution video signal according to claim 1, wherein the up-sampling filtering means includes an up-sampling filter, the pre-decimation filtering means includes a pre-decimation filter, and a convolution of the up-sampling filter and the pre-decimation filter is equivalent to a Lagrangian filter.

8. An apparatus for forming a low resolution video signal according to claim 1, wherein the up-sampling filtering means includes an up-sampling filter in the spatial domain and the down-conversion filtering means includes a down-conversion filter in the frequency domain equivalent to the up-sampling filter.

9. An apparatus for forming a low resolution video signal according to claim 1, wherein the up-sampling filtering means includes an up-sampling filter, the pre-decimation filtering means includes a pre-decimation filter, and the convolution of the up-sampling filter and the pre-decimation filter yields a FIR filter h(n) having coefficients $$h(n)=(13,-16,0,95,190,256,190,95,0,-16,-13)/256.$$

10. An apparatus for forming a low resolution video signal according to claim 9, wherein the pre-decimation filter is a FIR filter having coefficients $$h\_dec(n)=(-13, -3, 16, 82, 92, 82, 16, -3, -13)/256,$$

and the up-sampling filter is a FIR filter having coefficients $$h\_up(n)=(1, 1, 1).$$

11. An apparatus for forming a low resolution video signal according to claim 10, wherein the down-conversion filtering means includes a down-conversion filter in the frequency domain having the following coefficients:

$$H\_DCT=(1, 0.9493, 0.8047, 0.5885, 0.3333, 0.0782, -0.1381, -0.2826).$$

12. An apparatus for forming a low resolution video signal according to claim 1, wherein the up-sampling filtering means includes an up-sampling filter, the pre-decimation filtering means includes a pre-decimation filter, and a convolution of the up-sampling filter and the pre-decimation filter is equivalent to a FIR filter h(n) having coefficients $$h(n)=(-1/16, 0, 9/16, 1, 9/16, 0, -1/16).$$

13. An apparatus for forming a low resolution video signal according to claim 12, wherein the pre-decimation filter is a FIR filter having coefficients $$h\_dec(n)=(-1/8, 1/4, 3/4, 1/4, -1/8),$$

and the up-sampling filter is a FIR filter having coefficients $$h\_up(n)=(1/2,1,1/2).$$

14. An apparatus for forming a low resolution video signal according to claim 13, wherein the down-conversion filtering means includes a down-conversion filter in the frequency domain having the following coefficients:

$$H\_DCT=(1, 0.9619, 0.8536, 0.6913, 0.5000, 0.3087, 0.1464, 0.0381).$$

15. A method for forming a low resolution video signal from an encoded video signal representing a video image, the encoded video signal being a frequency-domain transformed high resolution video signal, the method comprising the steps of:

(a) receiving the encoded video signal as a plurality of blocks of high resolution frequency-domain video coefficient values, wherein the plurality of blocks comprises a macroblock;

(b) weighting selected ones of the high resolution frequency-domain video coefficient values within each block to generate corresponding blocks of filtered frequency-domain video coefficients;

(c) transforming each block of filtered frequency-domain video coefficients into a block of first-filtered pixel values;

(d) converting blocks of low resolution video signal pixel values into respective upsampled blocks of low resolution video signal pixel values;

(e) adding the blocks of the first-filtered pixel values to respective ones of the upsampled blocks of low resolution video signal pixel values to provide respective summed blocks of pixel values corresponding to the video image;

(f) filtering the summed blocks of pixel values across block boundaries to provide corresponding blocks of second-filtered pixel values; and (g) deleting selected ones of the second-filtered pixel values within each block to provide the blocks of low resolution video signal pixel values.

16. A method for forming a low resolution video signal according to claim 15, wherein and in step (d) a block of low resolution video signal pixel values corresponding to a reference frame of the video image is provided and in step (c) a block of first-filtered pixel values corresponding to the residual video image of a current frame of the video image is provided, the method further comprising the steps of:

(h) storing the block of low resolution video signal pixel values corresponding to the reference frame provided in step (d);

wherein in step (f) the summed block of pixel values is filtered to provide a block of the second-filtered pixel values corresponding to the current frame of the video image and in step (g) selected ones of the block of second-filtered pixel values corresponding to the current frame of the video image are deleted to provide a block of low resolution video signal pixel values corresponding to the current frame of the video image.

17. A method for forming a low resolution video signal according to claim 16, further comprising the step of converting the upsampled block of low resolution video signal pixel values corresponding to the reference frame into a motion compensated upsampled block of low resolution video signal pixel values corresponding to the reference frame and in step (e) the motion compensated upsampled block of low resolution video signal pixel values corresponding to the reference frame is added to the block of first-filtered pixel values corresponding to the residual video image of the current frame to provide a summed block of pixel values corresponding to the current frame of the video image.

18. A method for forming a low resolution video signal according to claim 16, wherein the weighting in step (b) and the filtering in step (f) combine to reduce aliasing distortion in the low resolution video signal.

19. A method of forming a low resolution video signal according to claim 16, wherein step (b) is equivalent to block mirror filtering.

20. A method for forming a low resolution video signal according to claim 19, wherein, in step (b), intra-block processing is performed on the plurality of high resolution frequency-domain video coefficient values and, in step (f), inter-block processing is performed on the summed block of pixel values corresponding to the current frame of the video image.

21. A method for forming a low resolution video signal according to claim 16, wherein, in step (d), the block of low resolution video signal pixel values corresponding to the reference frame are converted using an up-sampling filter and, in step (f), the summed pixel values are filtered using a pre-decimation filter and a convolution of the up-sampling filter and the pre-decimation filter yields a Lagrangian filter.

22. A method for forming a low resolution video signal according to claim 16, wherein, in step (d), the block of low resolution video signal pixel values corresponding to the reference frame are converted by up-sampling filtering in the spatial domain and, in step (b), down-conversion filtering in the frequency domain equivalent to the up-sampling filter in the spatial domain is used to generate the corresponding blocks of filtered frequency-domain video coefficients.

23. A method for forming a low resolution video signal according to claim 16, wherein, the filtering in step (d), is performed by an up-sampling filter, the filtering in step (f) is performed by a pre-decimation filter, and the convolution of the up-sampling filter and the pre-decimation filter yields a FIR filter h(n) having coefficients $$h(n)=(13,-16,0,95,190,256,190,95,0,-16,-13)/256.$$

24. A method for forming a low resolution video signal according to claim 23, wherein the pre-decimation filter is a FIR filter having coefficients $$h\_dec(n)=(-13, -3, 16, 82, 92, 82, 16, -3, -13)/256,$$

and the up-sampling filter is a FIR filter having coefficients $$h\_up(n)=(1, 1, 1).$$

25. A method for forming a low resolution video signal according to claim 24, wherein in step (b) the corresponding blocks of filtered frequency-domain video coefficients are generated using a down-conversion filter in the frequency domain having the following coefficients:

$$H\_DCT=(1, 0.9493, 0.8047, 0.5885, 0.3333, 0.0782, -0.1381, -0.2826).$$

26. A method for forming a low resolution video signal according to claim 16, wherein the filtering in step (d) is performed by an up-sampling filter, the filtering in step (f) is performed by a pre-decimation filter, and a convolution of the up-sampling filter and the pre-decimation filter is equivalent to a FIR filter h(n) having coefficients $$h(n)=(-1/16, 0, 9/16, 1, 9/16, 0, -1/16).$$

27. A method for forming a low resolution video signal according to claim 26, wherein the pre-decimation filter is a FIR filter having coefficients $$h\_dec(n)=(-1/8, 1/4, 3/4, 1/4, -1/8),$$

and the up-sampling filter is a FIR filter having coefficients $$h\_up(n)=(1/2,1,1/2).$$

28. An apparatus for forming a low resolution video signal according to claim 27, wherein in step (b) the corresponding blocks of filtered frequency-domain video coefficients are generated using a down-conversion filter in the frequency domanian having the following coefficients:

$$H\_DCT=(1, 0.9619, 0.8536, 0.6913, 0.5000, 0.3087, 0.1464, 0.0381).$$

* * * * *